(No Model.)

J. SACK.
INDIVIDUAL TELEPHONE CALL.

No. 423,575. Patented Mar. 18, 1890.

Witnesses:
W. Wagner
A. Jonghmans

Inventor:
J. Sack
by his attorneys
Roeder & Briesen ual call apparatus

UNITED STATES PATENT OFFICE.

JOSEPH SACK, OF DUSSELDORF, GERMANY.

INDIVIDUAL TELEPHONE-CALL.

SPECIFICATION forming part of Letters Patent No. 423,575, dated March 18, 1890.

Application filed May 1, 1889. Serial No. 309,207. (No model.)

*To all whom it may concern:*

Be it known that I, JOSEPH SACK, of Dusseldorf, Germany, have invented an Improved Individual Telephone-Call, of which the following is a specification.

This invention has for its object to obtain an individual call on telephone-wires with several stations at the desired call-room only without molesting the others, and after the call is given to replace automatically the apparatus for the individual call into the standard position.

The invention consists in the various features of improvement more fully pointed out in the claims.

Figure 1:
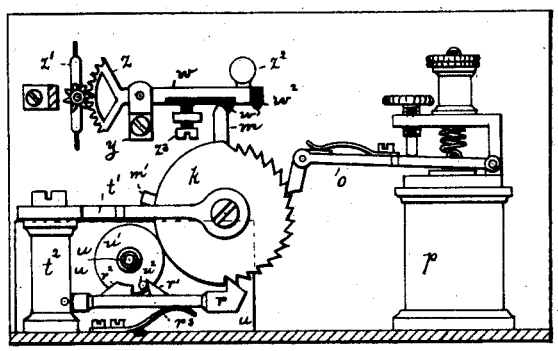
Figure 2:
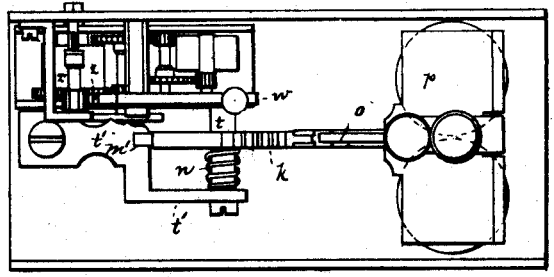

In the accompanying drawings, Figure 1 is a side elevation of my improved individual call; Fig. 2, a top view thereof, partly broken away; and Fig. 3, a plan of the circuit.

The letter $k$ represents a toothed wheel mounted upon shaft $t$, supported by two armed brackets $t'$, affixed to standard $t^2$. The wheel $k$ is engaged by pawl $r$, acted upon by spring $r^3$. $m'$ is a stop, and $m$ a pointer secured to wheel $k$.

$w$ is a lever turning in bearing $y$ and carrying a toothed segment $z$, that engages a toothed wheel on a vane $z'$. The motion of lever $w$ is confined between the stops $z^2$ $z^3$. The lever $w$ is provided with two ebonite pieces $w'$ $w^2$, to prevent by the forward or backward motion of wheel $k$ a metallic contact of pointer $m$ with lever $w$. The pointer $m$ must touch in the first moment the ebonite piece $w'$ or $w^2$. Metallic contact between the said parts can only be formed if the lever $w$, having been lifted by pointer $m$, falls back, with its metallic body resting upon the pointer. The pointer $m$ is connected by wheel $k$ with battery B, while the lever $w$ is connected by bearing $y$ with one end of the coil of the call-bell, the other end of the coil being connected with an insulated brass extension $c'$ of telephone-lever $c$. The extension $c'$ is adapted to make contact with post $c^2$, connected with the earth. This arrangement is necessary in order to prevent the bell from sounding until wheel $k$, with pointer $m$, is replaced to its normal position. The bell-circuit is closed when the telephone is hooked on, because by that operation the rear arm of lever $c$ is lifted and put with its extension $c'$ against the post $c^2$ to establish communication with the earth. The bell-circuit is broken by the removal of the telephone, as when the rear arm of lever $c$ is lowered with its extension the communication between the post $c^2$ and extension $c'$ is broken.

In order to prevent the simultaneous establishment of contact between pointer $m$ and lever $w$, and thereby of the bell-circuit at the several stations of the same wire, the pointer $m$ or the bearer $y$ is adjustably fastened. The vane $z'$ prevents the lever $w$ from being lowered too quickly, and the latter requires a few seconds for executing its motion imparted to it by the pointer $m$.

$u$ is a clock-work, which has for its object to bring back into the normal position the toothed wheel $k$ at the several stations on the same wire by means of the pawl $r$ and a spiral spring $n$. For this purpose the clock-work is provided with the escape-wheel $u'$, having one or more pins $u^2$. The pawl $r$ has a stop-pin $r'$ and a cam or similar device $r^2$. The spring $n$ is placed upon the axis of wheel $k$. In the normal position the pin $r'$ is close to pin $u^2$, and thereby arrests the wheel $u'$ and the clock-work. If, now, the wheel $k$ is moved forward one tooth, the pawl $r$ becomes disengaged, and is lowered, together with its pin $r'$, to liberate pin $u^2$. Thus the wheel $u'$ is released, and is free to be turned by the clock-work. During its revolution the wheel $u'$ slides with its pins $u^2$ on cam $r^2$ of pawl $r$. The pawl is thereby lowered, and is momentarily disengaged to release toothed wheel $k$, which is brought back to its normal position by spring $n$.

The time for the revolution of wheel $u'$ amounts to, say, 0.5 of a minute, during which time every call-room may be rung up—that is to say, any call-room of the rooms situated on the same wire or on two wires connected with each other at the exchange-office can be rung up in half a minute. This time being passed, the pin $u^2$ has left cam $r^2$, the pawl $r$ has re-engaged wheel $k$, the pin $r'$ rearrests pin $u^2$, and thus wheel $u'$ and the clock-work are stopped at the several stations on the same telephone-wire, and the apparatuses for the individual call are automatically and simultaneously brought back into their original positions. The individual call apparatus is under the influence of the electro-magnet $p$, which effects the forward motion of wheel $k$ by the armature $o$. To prevent the retention of the armature during its passage from one tooth to the other, its forward end is jointed, as shown. The arm $o$ is the armature of the electro-magnet $p$, and is brought back against the stop-screw by a spiral spring as soon as the current has been broken. The wheel $k$ is therefore not prevented from turning when released by a depression of pawl $r$.

Figure 3:
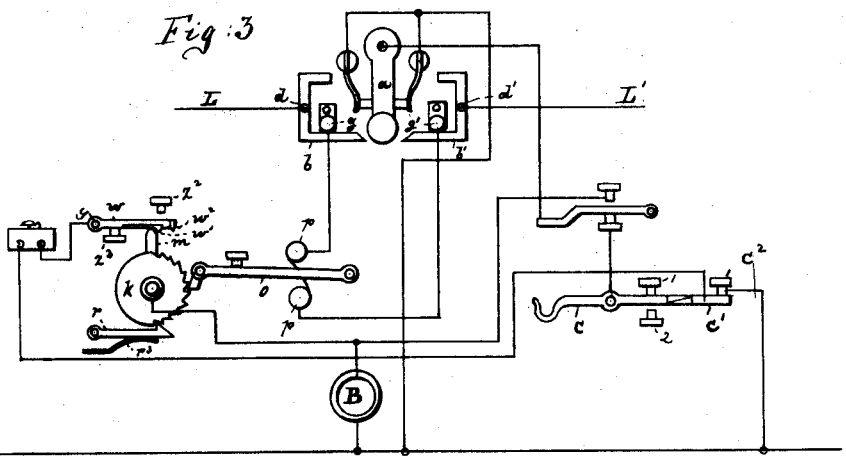

Fig. 3 shows the circuit of an intermediate station on a wire with several call-rooms by means of an automatic lever-switch. The latter is omitted at the terminal station, at which the wire is led directly to the electro-magnet $p$. The switch-arm $a$ being in its central position, the call-rooms are in the circuit. The current passes from wire L to post $d$, plate $b$, post $g$, electro-magnet $p$, post $g'$, plate $b'$, post $d'$, wire L', and thence to the terminal station.

The individual call of any one station, without interfering with the others, operates as follows: By the current the armature $o$ is attracted at all the stations. It gears into the teeth of wheel $k$ and revolves it for one tooth. Together with wheel $k$ there is revolved at all stations the pointer $m$. In order to call up, for example, room 3, three emissions of current—one emission per second—are to be given, whereby wheel $k$, with pointer $m$, is revolved for three teeth. At the rooms 1 and 2 (situated on the wire before the room 3 to be called) the pointer $m$ will indeed push one after another the ebonite piece $w'$ and lift lever $w$; but electrical contact cannot take place between lever $w$ and pointer $m$, because the latter has been already moved away before lever $w$, which occupies, say, two seconds' time for its motion, has fallen back. The bell-circuit cannot, therefore, be closed at rooms 1 and 2. At room 3 pointer $m$ will, by the third emission of current, arrive at the ebonite piece $w'$, push it, and lift thereby lever $w$; but as pointer $m$ cannot be moved further it stops under the metallic body of lever $w$ and establishes electric contact with lever $w$ as soon as lever $w$ has fallen back. The bell-circuit is now closed, but at the desired call-room only, by wheel $k$, pointer $m$, lever $w$, call-bell, brass extension $c'$ of lever $c$, post $c^2$, to earth. Therefore the bell sounds at the desired room only without molesting the other rooms on the wire. By the motion of wheel $k$ the pawl $r$ is lowered, and thereby leaves with its pin $r'$ the pin $u^2$. Thus the wheel $u'$ is released and turned by the clock-work. After 0.5 of a minute has passed the pin $u^3$ lowers by sliding on cam $r^2$ the ratchet $r$. The wheel $k$ is released and brought back into its normal position by spring $n$ automatically and simultaneously at all stations, and without any disorder on the wire, as described. At the conclusion of the conversation the telephone is hooked on (the switch-arm $a$ is brought back into its central position) and the room is replaced into the proper position on the wire.

What I claim is—

1. The combination of toothed wheel $k$, having pointer $m$, with the arrest-pawl $r$, motion-imparting armature $o$, and with lever $w$, having ebonite pieces $w'$ $w^2$, substantially as specified.

2. The combination of toothed wheel $k$, having pointer $m$, with lever $w$, armature $o$, and with pawl $r$, having pin $r'$ and cam $r^2$, and with wheel $u'$, having pin $u^2$, substantially as specified.

3. The combination of toothed wheel $k$, having pointer $m$, with the pawl $r$, having pin $r'$ and cam $r^2$, and with wheel $u'$, having pin $u^2$, and with armature $o$, and lever $w$, segment $z$, and vane $z'$, substantially as specified.

In testimony whereof I have signed this specification in the presence of two subscribing witnesses.

JOSEPH SACK.

Witnesses:
AUGUST V. PAPEN,
THEODOR MAYER.